US012587463B2

(12) United States Patent
Singh et al.

(10) Patent No.: US 12,587,463 B2
(45) Date of Patent: Mar. 24, 2026

(54) ANTENNA CONFIGURATION OPERATOR INTERFACE

(71) Applicant: GOGO BUSINESS AVIATION LLC, Broomfield, CO (US)

(72) Inventors: Yashvardhan Singh, Broomfield, CO (US); Karl Frantz, Berthoud, CO (US); Trevor Steffensen, Erie, CO (US); Munisekhara Reddy Avulapalli, Westminster, CO (US); Jared Gabel, Westminster, CO (US)

(73) Assignee: GOGO BUSINESS AVIATION LLC, Broomfield, CO (US)

( * ) Notice: Subject to any disclaimer, the term of this patent is extended or adjusted under 35 U.S.C. 154(b) by 327 days.

(21) Appl. No.: 18/207,380

(22) Filed: Jun. 8, 2023

(65) Prior Publication Data

US 2024/0414077 A1 Dec. 12, 2024

(51) Int. Cl.
| | |
|---|---|
| *H04L 43/045* | (2022.01) |
| *H04B 17/00* | (2015.01) |
| *H04L 43/0811* | (2022.01) |
| *H04L 43/50* | (2022.01) |
| *H01Q 1/28* | (2006.01) |

(52) U.S. Cl.
CPC ......... H04L 43/50 (2013.01); H04B 17/0085 (2013.01); H04L 43/045 (2013.01); H04L 43/0811 (2013.01); H01Q 1/28 (2013.01)

(58) Field of Classification Search
CPC .... H04B 17/00; H04B 17/0085; H04B 17/17; H04B 17/20; H04B 17/23; H04B 17/253; H04B 17/29; H04B 17/295; H04B 17/347; H04L 43/045; H04L 43/0811; H04L 43/50; H04W 4/44; H04W 4/46; H01Q 1/27; H01Q 1/28
See application file for complete search history.

(56) References Cited

U.S. PATENT DOCUMENTS

| | | | |
|---|---|---|---|
| 8,495,722 B1 * | 7/2013 | McCusker | .......... H04L 63/0853 726/4 |
| 9,830,816 B1 * | 11/2017 | Murray | .................. H04B 17/12 |

(Continued)

FOREIGN PATENT DOCUMENTS

| | | |
|---|---|---|
| GB | 2558359 A | 7/2018 |
| WO | WO-2020/154357 A1 | 7/2020 |

OTHER PUBLICATIONS

International Application No. PCT/US2024/032916, International Search Report and Written Opinion, mailed Sep. 18, 2024.

*Primary Examiner* — Frank Duong
(74) *Attorney, Agent, or Firm* — Holland & Hart LLP

(57) ABSTRACT

An antenna installation assistant application provides one or more GUIs representing ports of a vehicle-mountable antenna, as well as one or more on-board modems and/or other network hardware. The assistant application may determine, and indicate to a user of the assistant application, whether ports of the antenna are connected to ports of the modem (or other hardware), and more specifically, whether each connection is correct for the hardware. The assistant application thus may guide an installer through installation of one or more antenna in a manner that is responsive to actions taken by the installer, including correct or incorrect wired connections between hardware for a vehicle-based communications network.

20 Claims, 7 Drawing Sheets

(56) References Cited

U.S. PATENT DOCUMENTS

| 10,527,714 | B2 | | 1/2020 | Genghammer et al. | |
| 11,184,573 | B2 | | 11/2021 | Petruzzelli et al. | |
| 12,009,881 | B2 | * | 6/2024 | Palreddy | H04B 7/18506 |
| 2011/0270806 | A1 | * | 11/2011 | Weiler | H04L 43/00 |
| | | | | | 707/690 |
| 2017/0250860 | A1 | | 8/2017 | Kim et al. | |
| 2018/0279141 | A1 | | 9/2018 | Morhart et al. | |
| 2022/0060400 | A1 | * | 2/2022 | Claassen | H04L 43/0811 |

* cited by examiner

600

602

Processor(s)

612

606

Network interface(s)

604

Memory    616

Assistant application

608

I/O interface(s)

700

702
Cause test tone from first port of first device

704
Cause signal measurement at port(s) of second device

706
Detect connection between first port of first device and second port of second device 708
Determine whether detected connection is correct 710
Cause GUI to display indication of correct/incorrect connection

ANTENNA CONFIGURATION OPERATOR INTERFACE

FIELD

The present disclosure generally relates to communications systems, and in particular, to a configuration interface for one or more antenna systems of a vehicle.

BACKGROUND

Vehicles, including but not limited to aircraft, may establish one or more satellite-based and/or terrestrial communication links to receive information to, and/or transmit information from the vehicle. Such communications may, for example, enable the vehicle to receive live media content consumable by passengers of the vehicle (e.g., web browsing, sporting events, live news) at passenger-facing electronic devices, or enable live bidirectional communications to and from the passenger-facing devices (e.g., internet browsing, cellular calling, etc.). Additionally or alternatively, such communications links may enable the vehicle to communicate with the ground to support the necessary operations of vehicle instruments and/or crew (e.g., aircraft navigation systems or crew communications). In any case, a vehicle-based communications system typically supports such communications links via one or more vehicle-mounted antennas configured to transmit signals and receive signals from one or more external communications system elements (e.g., one or more satellites and/or one or more terrestrial stations). A vehicle-based communications system is typically enabled further via still additional communication components aboard the vehicle, which components may be implemented, for example, as a Line Replaceable Unit (LRU) on-board the vehicle.

Successful operation of a vehicle-based communications system relies upon correct installation and configuration of the various hardware and software components therein, including but not limited to the one or more vehicle-mounted antennas. Incorrect installation/configuration of the one or more antennas may result in loss of functionality for one or more aspects of an in-cabin vehicle network. There exist risks of errors in installation of the antenna(s) by operator personnel each time the antenna(s) are installed, e.g., upon initial commissioning of a vehicle, or upon reinstallation of the antenna(s) after repair/maintenance of the vehicle. These risks greater as the technical complexity of vehicle-mounted antennas increases (e.g., greater numbers of configurable ports). Still, vehicle-based communications systems traditionally rely upon the operator personnel to understand the antenna hardware to correctly install the antenna in each instance and/or to diagnose and remedy incorrect installations (e.g., incorrect wirings between ports of the antenna hardware and other on-board hardware).

SUMMARY

The disclosure of the present application describes an antenna installation assistant application, and systems and methods associated therewith. In embodiments, the assistant application provides one or more graphical user interfaces displaying representations of a plurality of ports of one or more mountable vehicle antennas, one or more on-board modems, and/or other on-board network hardware (e.g., in an LRU).

The antenna installation assistant application may obtain configuration information indicative of correct installation of the antenna(s), including information indicating correct wired connections between ports of the antenna and other internal and/or external on-board network hardware (e.g., from the antenna to each of one or more modems, and vice versa). Particularly, the stored information indicating correct wired connections between ports may include stored baseline noise and/or loss measurement thresholds for correct connections between components (e.g., for each antenna/modem combination). As an operator performs the installation via connecting wires between the antenna(s), modem(s), and other on-board network hardware, the installation application causes a test tone to be transmitted to a first port of one of the antenna, modem, or other hardware. The installation application further causes signal measurements to be performed at each of one or more other ports of the antenna, modem, or other hardware, and determine whether a connection was formed between the first port and each measured port based on whether the tone was detected at the measured ports. When the tone is detected at a particular port from among the measured ports (i.e., at a second port), the assistant application may cause a measurement of signal noise and/or loss from the tone to be performed, based upon comparison of the tone as measured at the second port to the tone as transmitted via the first port (e.g., by comparing the respective signal strengths).

After performing the measurement(s), the assistant application may determine whether the connection is correct for the hardware based on the stored configuration information, and provide an indication of whether the connection is correct to a user. Particularly, using the stored baseline noise and/or loss measurement thresholds, the assistant application may determine that a connection is correct for the hardware when the measured noise and/or loss is below the corresponding stored noise/loss threshold, or determine that the connection is incorrect form the hardware when the measured noise or loss meets or exceeds the corresponding stored threshold. When the connection is correct, the assistant application may report the specific noise and/or loss measurements to aircraft-based and/or ground-based system elements to allow subsequent operation of the antenna system to account for the specific noise and/or loss (e.g., to boost subsequent signals to be transmitted/received across the given port combination when the noise or loss is significant). Thus, the antenna installation assistant application guides an operator/maintenance personnel through installation of the antenna hardware by being aware of, and responsive to, the installation as it is actively being performed by the operator (i.e., to detect and respond to the wiring connections being performed by the operator on the particular hardware).

In an embodiment, a computer-implemented method for configuring an antenna to a modem for a communication network on-board a vehicle is provided, the method being performed via one or more processors of a computing device. The computer-implemented method may include (1) via a first communicative connection, causing a test tone to be transmitted via a first port of a first device from among a set of physical devices associated with a vehicle-based communication network, the set of devices consisting of an on-board modem of a vehicle and an antenna mountable to the vehicle, (2) via a second communicative connection, causing a signal measurement to be performed at one or more ports of a second device from among the set of on-board devices, (3) based upon the test tone and the signal measurement, detecting a communicative connection between the first port of the first device and a second port from among the one or more ports of the second device, (4)

based upon a comparison of the detected communicative connection to hardware configuration information indicative of correct communicative connections among the set of devices, determining whether the detected communicative connection between the first port and the second port is correct for the set of devices, and/or (5) causing an indication of whether the detected communicative connection is correct to be displayed via a graphical user interface at an electronic computing device of a user. The method may include additional, fewer, or alternate actions, including those described herein.

In another embodiment, one or more non-transitory computer-readable media are provided. The one or more non-transitory computer readable media store non-transitory computer executable instructions that, when executed via the one or more processors, cause one or more computers to (1) via a first communicative connection, cause a test tone to be transmitted via a first port of a first device from among a set of physical devices associated with a vehicle-based communication network, the set of devices consisting of an on-board modem of a vehicle and an antenna mountable to the vehicle, (2) via a second communicative connection, cause a signal measurement to be performed at one or more ports of a second device from among the set of on-board devices, (3) based upon the test tone and the signal measurement, detect a communicative connection between the first port of the first device and a second port from among the one or more ports of the second device, (4) based upon a comparison of the detected communicative connection to hardware configuration information indicative of correct communicative connections among the set of devices, determine whether the detected communicative connection between the first port and the second port is correct for the set of devices, and/or (5) cause an indication of whether the detected communicative connection is correct to be displayed via a graphical user interface at an electronic computing device of a user. The one or more non-transitory computer-readable media may include additional, fewer, or alternate instructions, including those described herein.

In another embodiment, a computing system associated with a vehicle-based communication network is provided. The computing system may include an antenna mountable to a vehicle, an on-board modem of the vehicle, one or more processors, and one or more memories storing instructions that, when executed via the one or more processors, cause the one or more processors to (1) via a first communicative connection, cause a test tone to be transmitted via a first port of a first device from among a set of physical devices associated with a vehicle-based communication network, the set of devices consisting of the on-board modem and the antenna, (2) via a second communicative connection, cause a signal measurement to be performed at one or more ports of a second device from among the set of on-board devices, (3) based upon the test tone and the signal measurement, detect a communicative connection between the first port of the first device and a second port from among the one or more ports of the second device, (4) based upon a comparison of the detected communicative connection to hardware configuration information indicative of correct communicative connections among the set of devices, determine whether the detected communicative connection between the first port and the second port is correct for the set of devices, and/or (5) cause an indication of whether the detected communicative connection is correct to be displayed via a graphical user interface at an electronic computing device of a user. The computing system may include additional, fewer, or alternate computing elements and/or instructions, including those described herein.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments and explain various principles and advantages of those embodiments.

DETAILED DESCRIPTION

Figure 1:
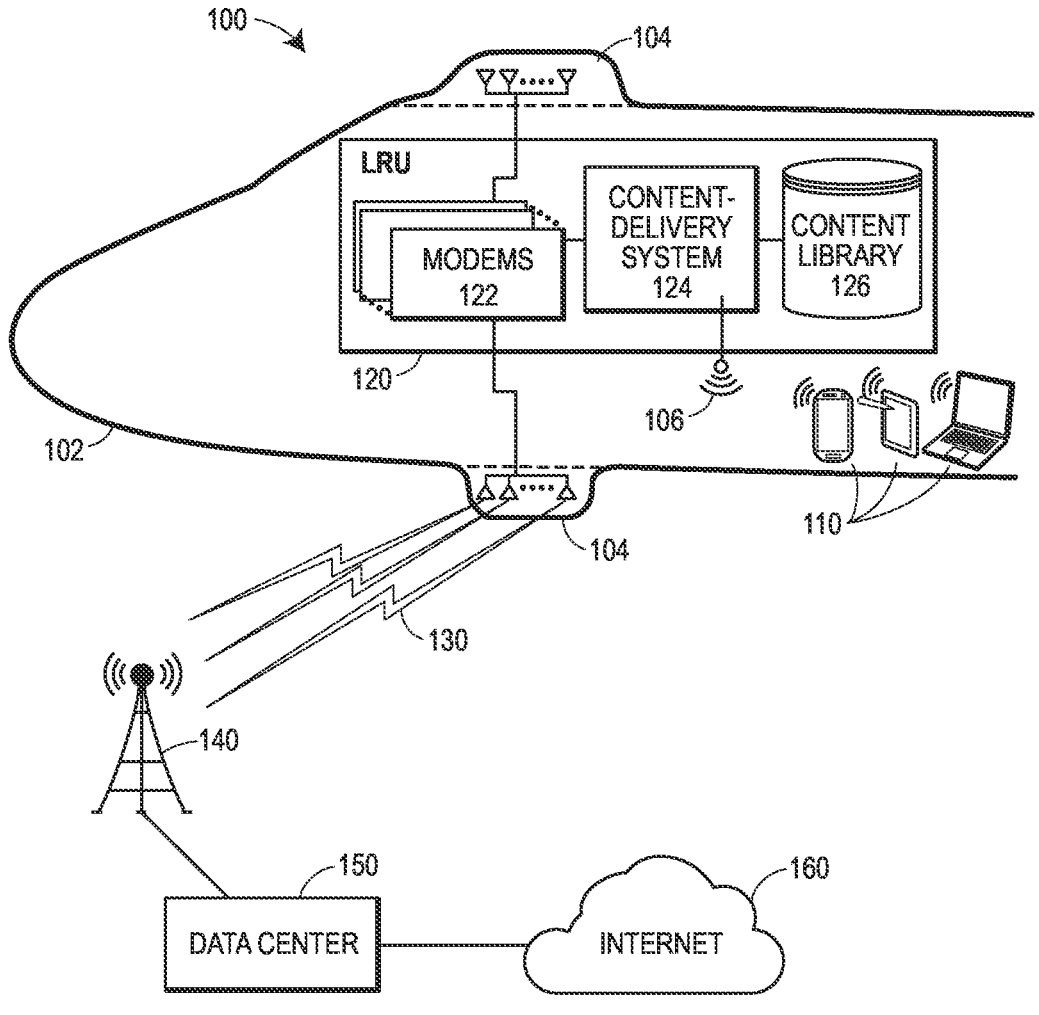
FIG. 1 depicts an example computing environment in which the techniques described herein may be implemented, in accordance with some embodiments.

The disclosure of the present application describes an antenna installation assistant application for a vehicle-mountable antenna, and systems and methods associated therewith. At a high level, the antenna installation assistant application displays one or more graphical user interfaces (GUIs) that provide a real-time representation of ports in the antenna hardware and other on-board network hardware of the vehicle (e.g., LRU/modem hardware for an aircraft cabin network). The GUIs indicate connections that have been made by the installer between ports while installing the antenna hardware (e.g., from an antenna to one of one or more on-board modems, or vice versa). Display and user interaction capabilities of the antenna installation assistant application can be implemented, for example, at an electronic computing device of a user, such as a mobile computing device (e.g., smartphone, smart wearable device, tablet, etc.), laptop computer, desktop computer, and/or another electronic computing device accessible to the user during the installation of the physical antenna hardware for the vehicle. In embodiments, the electronic computing device executing user-facing aspects of the antenna installation assistant (e.g., user input/output) may be in communication with on-board network hardware of the vehicle (e.g., an LRU) executing and/or storing other functionalities or information associated with (e.g., implementing communications with on-board hardware such as antennas, and/or storing of baseline noise and/or loss factors, thresholds, etc. associated with communications across the hardware).

In embodiments, the one or more GUIs of the antenna installation assistant application display graphical representations of the antenna hardware and the other on-board network hardware, including representations of physical ports in each hardware. The graphical representation of each hardware or port may include an alphanumeric identifier of the hardware or port. The one or more GUIs may include other graphical indicators of the hardware/ports, including for example color indicators that may match or mimic the appearance of the physical hardware. The graphical representation of any particular port may further include a graphical indication of whether a wire has (or has not) connected the particular port to another port (a "second port") of the antenna or other on-board network hardware. More particularly, when the particular port has been connected to the second port, the graphical representation of the particular port may indicate whether the connection for the particular port is correct, based upon hardware configuration information specific to the involved hardware. The indication of whether the connection is correct may, for example, be color-coded, for example by providing a green indicator for a correct connection involving the particular port, or a red indicator for an incorrect connection involving the particular port.

The assistant application may store (or otherwise obtain) hardware configuration information indicative of correct installation of the antenna(s), including information indicating correct wired connections between the antenna and the other on-board vehicle network hardware (e.g., one or more modems). Particularly, the stored information indicating correct wired connections between ports may include stored baseline noise and/or loss measurement thresholds for correct connections between components (e.g., for each antenna/modem combination).

To determine whether particular ports have been connected during an antenna installation, the assistant application may cause a test tone to be transmitted on any first port of the antenna hardware or of one of the one or more modems. Upon transmitting of the test tone, the assistant application further may cause signal measurements to be performed on all ports of the opposing hardware (e.g., one or more modems if the first port was on the antenna, or vice versa). When the tone is detected at a particular port from among the measured ports (i.e., at a second port), the assistant application may cause a measurement of signal noise and/or loss from the tone to be performed, based upon comparison of the tone as measured at the second port to the tone as transmitted via the first port (e.g., by comparing the respective signal strengths). The assistant application may reference the detected connection to the stored/obtained hardware configuration information to determine whether the installed connection is correct and display an indication of whether the connection is correct to the installer. Particularly, using the stored baseline noise and/or loss measurement thresholds, the assistant application may determine that a connection is correct for the hardware when the measured noise and/or loss is below the corresponding stored noise/loss threshold, or determine that the connection is incorrect form the hardware when the measured noise or loss meets or exceeds the corresponding stored threshold. For any given first port, there may only be one second port that produces a noise or loss measurement below the noise or loss threshold, i.e., only one correct second port. When the connection is correct, the assistant application may report the specific noise and/or loss measurements to aircraft-based and/or ground-based system elements to allow subsequent operation of the antenna system to account for the specific noise and/or loss (e.g., to boost subsequent signals to be transmitted/received across the given port combination when the noise or loss is significant).

The assistant application may perform the test tone measurements at various times associated with installation and/or operation of the antenna. For example, the assistant application may perform the test tone measurements upon the initial antenna installation and/or upon each re-installation of an antenna, for example after repair or maintenance of the vehicle. The assistant application may also perform the test tone measurements upon each boot of the antenna, e.g., for each flight of the aircraft, such that updated path loss measurements reflect actual in-flight conditions. Still additionally or alternatively, the assistant application may perform the test tone measurements at pre-determined time intervals while the assistant application is in use (e.g., 30 seconds, 15 seconds, 5 seconds, etc.), to thereby assist the installer during an antenna installation. As another example, a port may have a sensor configured to indicate a wired connection being formed using the port, and the assistant application may perform the test tone measurement any time for any given port in response to detecting a wired connection involving the port. As still yet another example, as will be described herein, one or more GUIs of the assistant application may provide an interactive control allowing the user to automatically perform test tone measurements on-demand. In any case, the assistant application may repeat the test tone measurement for any port or combination of ports of the antenna hardware and other on-board network hardware (e.g., modem(s)). Based upon the test tone measurement(s), the assistant application updates the GUI(s) to display an indication of whether the connection is correct for each respective port. Examples of the GUI(s) will be provided in subsequent portions of this description.

Thus, antenna installation assistant application may thus visually guide the installer through installation of the antenna hardware to a vehicle, in a manner that is responsive to the actual connections made by the installer at various stages of the installation. The installer using the assistant application may reduce the amount of time and effort necessary to prevent, or at least diagnose and remedy, incorrect connections while installing the antenna. These benefits may be particularly pronounced in increasingly complex on-board network environments, for example in environments in which a single vehicle-mounted antenna services multiple on-board modems operating to enable use of multiple communications standards between the on-board network hardware and external network hardware (e.g., EVDO, 5G, LTE, CDMA, etc.).

Although examples provided herein will describe an example aircraft network environment (e.g., an aircraft-mounted antenna and other network hardware on-board the aircraft), it should be appreciated that the systems and methods herein may be applied to other types of vehicles, particularly where such vehicles utilize one or more antennas in combination with other on-board network hardware to facilitate an on-board network in a cabin of the vehicle while the vehicle is in-transit. Such vehicles may include trains, boats, buses, etc.

Although the following text discloses a detailed description of example methods, apparatus and/or articles of manufacture, it should be understood that the legal scope of the property right is defined by the words of the claims set forth at the end of this patent. Accordingly, the following detailed description is to be construed as examples only and does not describe every possible example, as describing every possible example would be impractical, if not impossible. Numerous alternative examples could be implemented, using either current technology or technology developed after the filing date of this patent. It is envisioned that such alternative examples would still fall within the scope of the claims.

Example Communication System

FIG. 1 depicts an example communication system 100 via which the techniques described herein may be implemented. The communication system 100 includes an aircraft 102 having one or more antennas 104 mounted to the aircraft 102. In the embodiment illustrated in FIG. 1, one antenna 104 is mounted to the belly of the aircraft 102 (e.g., to implement one or more air-to-ground (ATG) networks, for example over the S-band, cellular/LTE bands, etc.). One antenna 104 is mounted to the top of the fuselage of the aircraft 102 (e.g., to implement one or more satellite-based networks, for example over the $K_u$-band, $K_a$-band, L-band, S-band, etc.). Additional or fewer antennas 104 are possible, in various embodiments. For example, one or more antennas 104 may be mounted to a different part(s) of the aircraft 102. In some embodiments, a single aircraft-mounted antenna 104 (or, each of one or more antennas 104), may operate to facilitate communications to and from the aircraft 102 via multiple different communications standards (e.g., two or more standards from among EVDO, 5G, LTE, CDMA, etc.). Although the aircraft 102 will be described with respect to FIG. 1, it should be understood that, in various alternative embodiments, the one or more antennas 104 may be mounted to another type of vehicle (e.g., personal automobile, bus, train, boat, helicopter, emergency vehicle, etc.) to provide service via one or more ground-based or satellite-based communication networks to the vehicle.

The communication system 100 uses the antenna(s) 104 and other on-board network equipment to provide a communication network 106 (i.e., one or more communication networks) within the cabin of the aircraft 102 (e.g., a Wi-Fi network, a cellular network, Bluetooth®, one or more wired networks, etc.). The communication network 106 enables personal electronic devices 110 of occupants on-board the aircraft 102 to send and receive data, e.g., to browse the Internet or to consume other media content (e.g., movies, television, news broadcasts, and/or other media that may be stored locally at the aircraft 102 and/or transmitted from the ground). While not shown in FIG. 1 for clarity of illustration, the aircraft 102 may include electronics systems such as avionics systems (or equivalents for non-aircraft vehicles), such as communication systems, navigation systems, instrumentation, flight-control systems, or collision avoidance systems, any one or more of which may additional utilize the communication network 106 (and, in turn, the antenna(s) 104 and other on-board equipment) to send and/or receive communications to and/or from the ground.

As many of the electronics systems of the aircraft 102 may require a degree of stability and/or secure attachment during transportation, at least some of the other on-board network equipment of the aircraft 102 may be included in a line replaceable unit (LRU) 120 that is fixedly or rigidly attached to the aircraft 102. The LRU 120 may be comprised of modular components that may be sealed units of an aircraft, which are designed to be replaced within a short time without using specialized tools enabling the aircraft 102 to quickly return to service, while LRU 120 is being tested and repaired. Typically, the LRU 120 is an electronic assembly that performs a specific function in the aircraft 102 and may be removed or replaced as a unit and serviced at a vehicle maintenance center. Some of the electronics systems of the aircraft 102 may not be included in the LRU 120. For example, instead of being fixedly connected to the aircraft 102 via the LRU 120, some electronics systems may be fixedly connected to the aircraft 102 using some other means, such as a bracket or other connecting device. In any case, on-board network equipment of the aircraft 102 includes one or more modems 122, a content-delivery system 124, and a content library 126. In some embodiments, but not necessarily all embodiments, the one or more modems 122 are integrated into the LRU 120.

The one or more modems 122 may be configured to be compatible with a plurality of different communication standards utilized by one or more ATG communication links 130, and/or one or more satellite communication links. The one or more ATG communication links 130 may utilize communication protocols associated with terrestrial communications (e.g., TDMA, GSM, CDMA, LTE, WiMAX, Wi-Fi, 4G, 5G, etc.) and/or associated with frequencies in the $K_a$ band, the Ku band, the L band, and/or any other suitable wireless communication frequency bands. Each of the one or more modems 122 may be connected (wired or wirelessly) to at least one respective antenna 104. The communication links 130 may utilize communication protocols associated with terrestrial communications (e.g., TDMA, GSM, CDMA, LTE, WiMAX, Wi-Fi, 4G, 5G, etc.) and/or associated with frequencies in the $K_a$ band, the $K_u$ band, the L band, and/or any other suitable wireless communication frequency bands.

Each of the modems 122 may operate over one or more frequency bands, and the aircraft 102 may utilize the modems 122 to receive data or to transmit data from the aircraft 102. For example, the aircraft 102 may include thereon one modem of the modems 122 tuned to a frequency band that is allocated for direct communications between the aircraft 102 and ground stations, or on which a direct air-to-ground (ATG) communication link is supported (e.g., 849-851 MHz and 894-896 MHz). The aircraft 102 may additionally or alternatively include thereon one modem of the modems 122 tuned to a frequency band that is allocated for satellite communications such as the L band (40 to 60 GHz or 1 to 2 GHZ), the $K_u$ band (12-18 GHZ), the $K_a$ band (26.5-40 GHZ), and/or other spectrum that is allocated for satellite communications. Furthermore, each of the modems 122 may operate in accordance with certain communication protocols. For example, at least one of the modems 122 may operate in accordance with a 4G communication protocol and at least one of the modems 122 may operate in accordance with a 5G communication protocol. In some embodiments, each of two or more modems 122 is configured to be compatible with respective ones of a plurality of different communication links, and a single antenna 104 may support communications using the plurality of different communication links (e.g., multiple ATG links, multiple satellite-based links, or a combination of one or more ATG communication links and one or more satellite-based links). The ATG communications link(s) 130 (and/or one or more satellite-based communication links) may connect the aircraft 102 to one or more terrestrial base stations 140, which may in turn be connected to one or more data centers 150 and/or other external networks, e.g., Internet 160.

Returning to the LRU 120, the content-delivery system 124 is configured to, among other things, deliver content from the content library 126 to the electronic devices 110 via the communication network 106. The electronic devices 110 may include any mobile computing device, such as a smartphone, a tablet, a laptop computer, a personal digital assistant, an e-reader, smart glasses, smart watches, and/or any other mobile computing device capable of wireless communications. The electronic devices 110 may initiate requests, in response to user input, for example, for content. The content-delivery system 124 may deliver content to the electronic devices 110 regardless of its connection to an external network, such as the Internet 160. The content-delivery system 124 may be configured to provide an interface to the electronic devices 110 via the communication network 106 to view a list of content, select content, view content, download content, or purchase content or access to content, such as via the Internet 160 or the content library 126. The content-delivery system 124 may communicate with the electronic devices 110, for example, via one or more wired access points and/or wireless access points (WAPs) placed around the cabin of the aircraft 102. The communication network 106 may include additional networking equipment such as routers, hubs, switches, repeaters, bridges, and/or gateway devices. Some of the networking equipment may utilize a spread spectrum paradigm and/or one or more RF bands (e.g., an ISM band, such as the 900 MHz band, 2.4 GHz band or 5 GHz band) to facilitate communication.

The content provided via the content-delivery system 124 may be presented at a user interface of one or more of the electronic devices 110, in response to, for example, one or more requests from the one or more electronic devices 110 to deliver the content to the one or more electronic devices 110. Some examples of media content include movies, television shows, songs, video games, digital magazines, news feeds, web data, applications, messages, or any other content involving textual, audio and/or visual presentation. Content may also include software, configuration data, files, etc. that may be installed in, applied to, made available (e.g., as a file server) via the aircraft 102 or a system of the aircraft 102 (e.g., the LRU 120) by, for example, maintenance personnel. In particular, software content provided by the content-delivery system 124 to one or more electronic devices 110 can include an antenna installation assistant application (and/or data or functionalities associated therewith) provided to one or more electronic devices 110 of operator or maintenance personnel associated with the aircraft 102.

Each of the antennas 104, respectively, is installed to the aircraft 102 via physically affixing the hardware of the antenna 104 to the fuselage or other portion of the aircraft 102 to which the antenna 104 is mounted (e.g., via bolts, latches, adhesives, etc.). Installing an antenna 104 to the aircraft 102 additionally involves physically connecting wires between particular ports of the antenna 104 and particular ports of one or more modems 122 for which the antenna 104 is to facilitate communications (i.e., connecting antenna ports to modem ports or vice versa). Incorrect connection of ports during installation may render aspects of the modem(s) 122 and/or antenna 104 at least partially inoperable. Thus, correct connection of hardware ports during installation is of great concern to operator/maintenance personnel working on the aircraft 102. However, correctly forming the connections between the antenna 104 and modem(s) 122 may be difficult, particularly for installers with less experience with a given antenna 104 and/or modem 122. These difficulties may be exacerbated for increasingly complex antenna hardware, e.g., in cases where a single antenna 104 is to be installed to service multiple different modems 122 to implement multiple different communications standards. Moreover, beyond just the initial mounting of the antenna 104 to the aircraft 102, an antenna 104 over time may need to be re-installed to the aircraft 102 many times, e.g., after being removed during maintenance and/or repair of the aircraft 102 or antenna 104. In view of these challenges, the antenna installation assistant discussed in this disclosure provides graphical user interfaces to ease the process of installing an antenna and prevent misconnections between an antenna 104 and the other on-board hardware of the aircraft 102 (e.g., modem(s) 122).

Example Antenna Installation Assistant Application Interfaces

FIGS. 2-5 depict example graphical user interfaces (GUIs) that may be displayed by an antenna installation assistant application for one or more vehicle-mounted antennas (e.g., antenna(s) 104 of the aircraft 102 of FIG. 1). The GUIs of FIGS. 2-5 may be displayed, for example, via one or more displays (e.g., a touchscreen) of a client electronic device associated with an installer (operator/maintenance personnel) for the vehicle.

The antenna configuration assistant application, while operating to execute the GUIs described herein, may be communicatively connected to on-board network equipment of the vehicle. For example, with reference to FIG. 1, the assistant application may be communicatively connected (wiredly and/or wirelessly) to one or more modems 122 and/or one or more antennas 104 to (1) detect wired connections formed at the one or more modems 122 and/or one or more antennas 104, (2) cause the transmission of test tones through ports of the one or more modems 122 and/or one or more antennas 104, and/or (3) cause and receive signal measurements of the test tones at ports of the one or more modems 122 and/or one or more antennas 104.

In some embodiments, the client electronic device may be located on-board the vehicle, while the vehicle is stationary and/or while the vehicle is in-transit. The client electronic device may, for example, be an on-board smartphone, smart wearable device, laptop computer, desktop computer, etc. (e.g., one of the electronic devices 110 of FIG. 1). Alternatively, in embodiments, the client electronic device executing the assistant application may be located remotely from the vehicle, including while the vehicle is in-transit (e.g., the assistant application may operate on the ground to occasionally or continuously perform path loss measurements after correct installation of the antenna(s) to the modem(s)). In embodiments, non-transitory instructions of the antenna installation assistant application are stored via one or more memories of the client electronic device and, when executed via one or more processors of the client electronic device, cause the client electronic device to perform the functionalities of the assistant application described herein, including displaying the GUIs and receiving user input via the GUIs as described herein.

Figure 2:
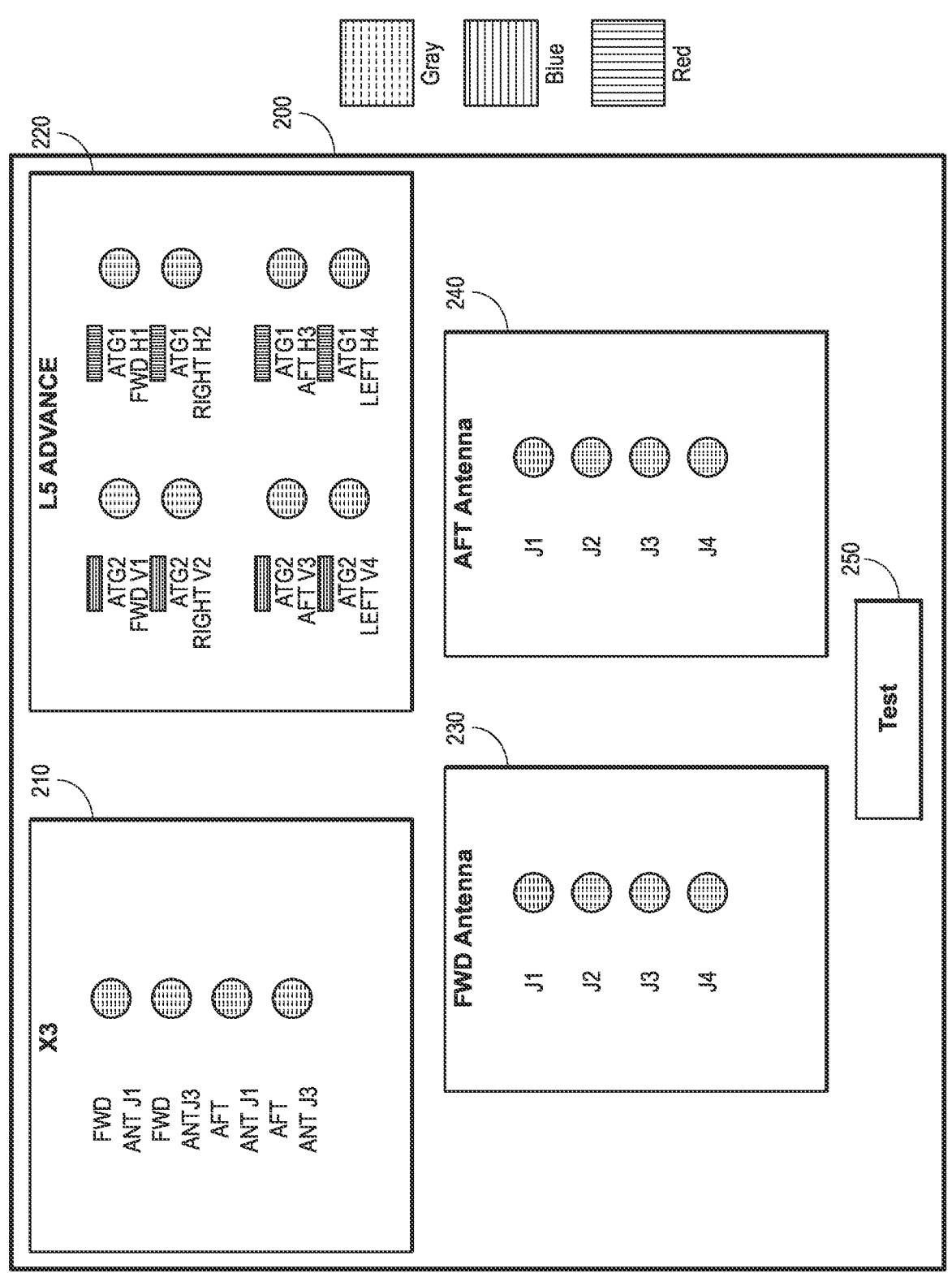
FIG. 2 depicts an example representation of a graphical user interface (GUI) of an antenna installation assistant application, in accordance with some embodiments.

Proceeding to FIG. 2, a first GUI 200 displays panels 210 and 220, respectively, indicating ports of each of two modems of a vehicle ("X3," "L5 AVANCE"). The GUI 200 similarly displays panels 230 and 240, respectively, indicating ports of each of two antennas installed (or to be installed) to the vehicle ("FWD Antenna," "AFT Antenna"). Visually, each of the panels 210, 220, 230, and 240 may be visually arranged to match or mimic the layout of the physical hardware the panels respectively represent. For example, port indicators of the modem panels 210 and 220 can be arranged vertically and/or horizontally in a manner similar to that which the port connectors are found on the actual modem hardware. Likewise, port indicators in the antenna panels 230 and 240 can be arranged vertically in a manner similar to the actual arrangement of port connectors on the antenna hardware (e.g., on a back panel thereof). Additional graphical detail may be provided in any of the panels 210, 220, 230, and/or 240 to better represent the actual modem and/or antenna hardware. For example, as represented in the second modem panel 220, color indicators may be provided above the text labeling each port if, for example, color-based indicators are present on or near the corresponding ports on the hardware.

In the representation of FIG. 2, a circular indicator for each port indicator in the panels 210, 220, 230, and 240 is colored gray, which may indicate that no wired connections between the antenna and modem(s) have yet been formed, or alternatively, that the assistant application is not in signal communication with the antenna(s) and/or modem(s) to receive information indicating that connections have been formed. As will be described with respect to FIG. 3, though, circulator indicators for each port may be illuminated with different colors based upon whether the installer has correctly or incorrectly wired ports between antenna and modem hardware. Still referring to FIG. 2, the GUI 200 includes a "test" control 250 that, upon selection by the user (e.g., via a touchscreen tap), may cause test tones of the antenna(s) and/or modem(s) to transmit test tones and perform signal measurements as described herein to detect connections and/or path losses between ports.

Figure 3:
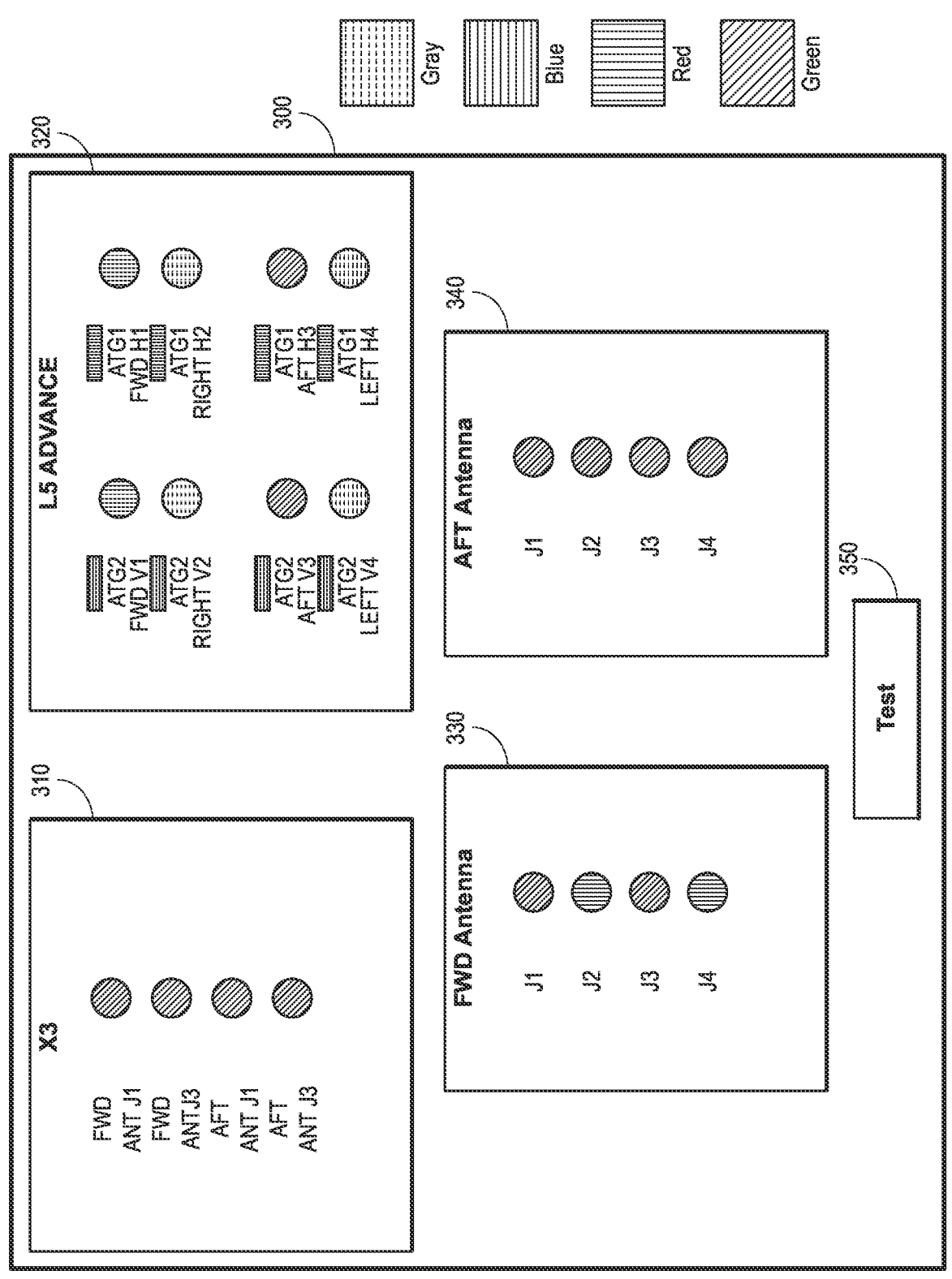
FIG. 3 depicts another example representation of a GUI of the antenna installation assistant application, in accordance with some embodiments.

A GUI 300 depicted in FIG. 3 includes modem panels 310 and 320, and antenna panels 330 and 340, arranged similarly as in the GUI 200 of FIG. 2. Each of the panels 310, 320, 330, and 340 displays text indicators of each of a plurality of ports and circular indicators to show whether a connection has been correctly formed using each port. The assistant application may determine whether ports are correctly connected by causing the test tone to be transmitted to any first port and performing signal measurements at each port of the opposing hardware. If signal measurements detect the test tone on any port ("second port") of the opposing hardware, the assistant application determines that the installer has connected the first port to the second port. The assistant application may compare the detected connection to hardware configuration information reflecting correct connections for the system, which the assistant application may store in local memory and/or otherwise obtain e.g., via signal communications with another source(s).

As depicted in FIG. 3, green indicators for a port indicate that an installer has formed a correct connection involving the port, i.e., connected the port to its correct counterpart, based on comparison of the hardware configuration information to the signal measurements. Conversely, red indicators for a port indicate that an installer has formed an incorrect connection involving the port. For example, the GUI 300 shows that the installer has made incorrect connections involving each of ports "ATG2 FWD V1" and "ATG1 FWD H1" of the second modem (panel 320), and each of ports "J2" and "J4" of the first antenna (panel 330). For example, the installer may have connected ATG2 FWD V1 to J2 and ATG FWD H1 to J4, whereas the installer should have connected ATG FWD V1 to J4 and ATG FWD H1 to J2.

Figure 4:
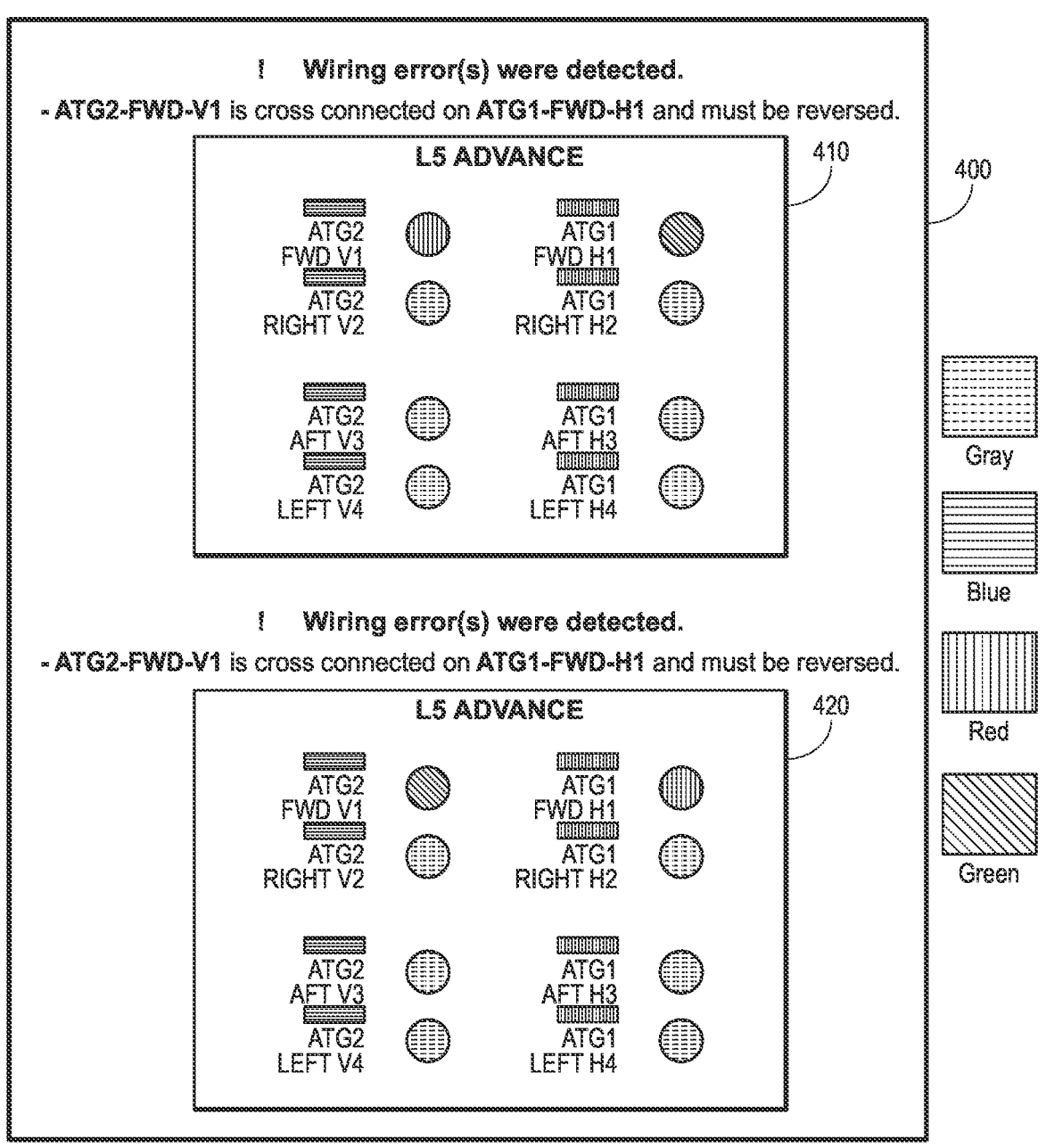
FIG. 4 depicts yet another example representation of a GUI of the antenna installation v application, in accordance with some embodiments.
Figure 5:
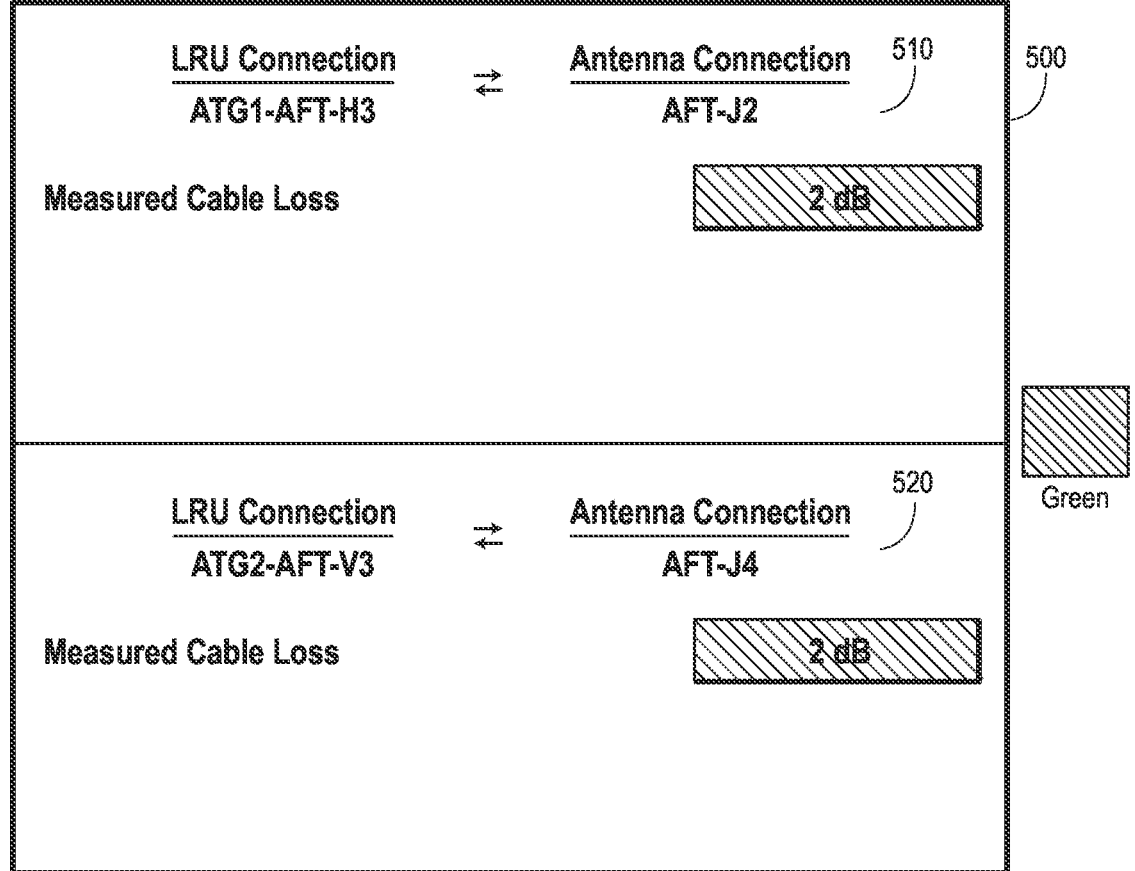
FIG. 5 depicts still yet another example representation of a GUI of the antenna installation assistant application, in accordance with some embodiments.

FIG. 4 depicts an example notification GUI 400 for providing, to a user of the antenna installation assistant application, information regarding errors made during installation of one or more antennas. In particular, first and second notification panels 410 and 420 display text explanations of the wiring errors, which may for example indicate (1) which port was incorrectly corrected ("cross connected") to which other port, and/or (2) what corrective action should be taken to remedy the incorrect connection (e.g., disconnecting ("reversing") the incorrect connection, or reconnecting one port to a different port). Similarly to the GUI 300 of FIG. 3, the notification panels 410 and 420 include a display of the ports of the hardware for which the incorrect connections were made (e.g., a display of the L5 AVANCE showing red indicators).

Upon a correct wired connection being formed between the antenna and the other on-board hardware (e.g., one of one or more on-board modems), the assistant application may calculate the noise or change in power density (path loss) between the connected ports. As depicted in still another GUI 500 in FIG. 5, the antenna installation assistant application may display indications of the calculated path loss across each connection formed by the installer, and indications of the measured path loss (in decibels (dB)). In some embodiments, the assistant application performs the path loss measurements only once all required connections for an antenna (or for a plurality of antennas) have been configured. The assistant application may store (or otherwise obtain, e.g., from the modem) a pre-determined threshold noise loss value for each respective correct connection, with the threshold values differing for each hardware combination in some embodiments. If the calculated loss for a connection exceeds the pre-determined threshold, the assistant application may notify the user that the formed connection is incorrect.

It should be appreciated that additional or alternative GUIs or elements therein may be envisioned based upon the present description. Moreover, in some embodiments, aspects of certain ones of the GUIs of FIGS. 2-5 may be combined in a single GUI with aspects of other ones of the GUIs of FIGS. 2-5. Visual arrangements of aspects of the GUIs may be altered without deviating from the functionalities described herein.

Example Computing Device

Figure 6:
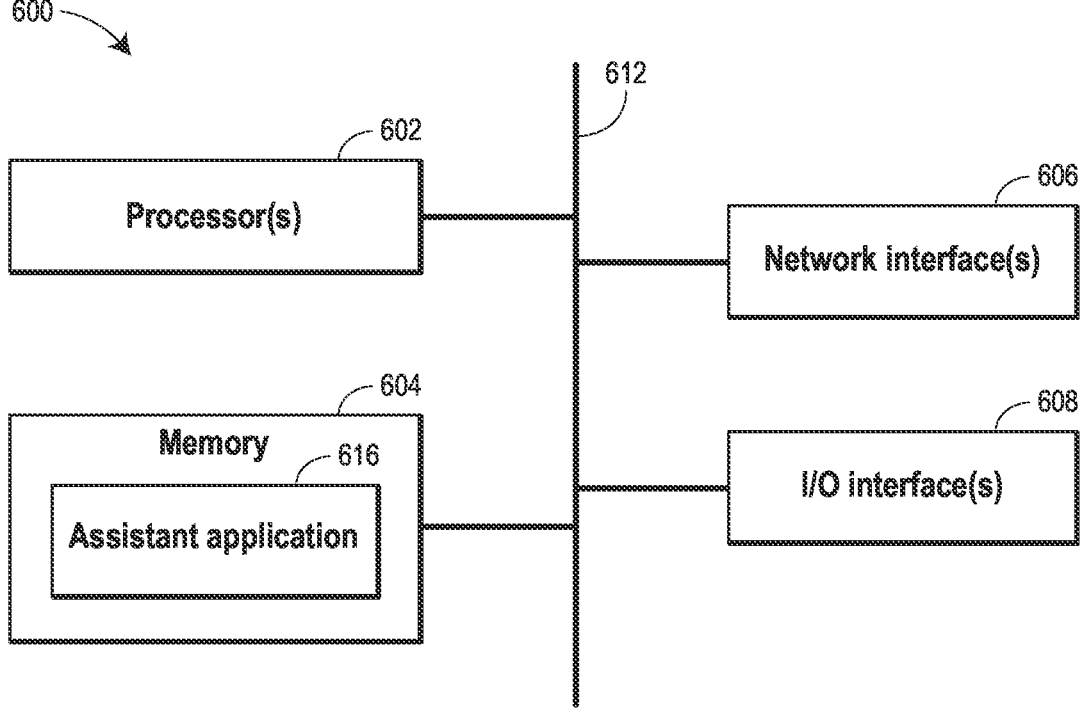
FIG. 6 depicts a block diagram of an example computing device at which an antenna installation assistant application may be implemented, in accordance with some embodiments.

FIG. 6 depicts an example computing device 600 that may implement an antenna installation assistant application, in some embodiments. The computing device 600 may, for example, be one of the personal electronic devices 110 of FIG. 1, and/or another on-board or off-board electronic device through which the assistant application is implemented.

The computing device 600 includes a processor 602 (i.e., one or more processors), such as a microprocessor, controller, and/or other suitable type of processor. The computing device 600 further includes a memory 604 (i.e., one or more computer memories), which may include volatile memory and/or non-volatile memory containing computer executable instructions accessible by the process or 602 to cause the computing device 600 to perform actions described herein. The computing device 600 further includes a network interface 606 (i.e., one or more network communication interfaces) and/or an input/output (I/O) interface 608 (i.e., one or more input and/or output interfaces). The components of the computing device 600 are operatively coupled to each other via a computing bus 612.

The network interface 606 may, for example, enable the computing device 600 to communicate with one or more other devices, such as a base station, LRU, modem, antenna, etc. The network interface 606 may include any suitable type of communication interface(s), such as wired interfaces and/or wireless interfaces configured to operate in accordance with any suitable communication protocol(s). Example network interfaces 606 include a TCP/IP interface, a Wi-Fi transceiver (e.g., according to the IEEE 802.11x family of standards), an Ethernet transceiver, a cellular network radio, a satellite network radio, or any other suitable interface based upon any other suitable communication protocols or standards. The I/O interface 608 may include, for example, a Bluetooth® interface, a near-filed communication (NFC) interface, a universal serial bus (USB) interface a serial interface, an infrared interface, etc., to enable receipt of user input (e.g., a touch screen, keyboard, mouse, touch pad, joystick, trackball, microphone, button, etc.) and communication of output data to the user (e.g., via a display, speaker, printer, etc.).

Returning to the memory 604, non-transitory portions of the memory 604 may particularly include an antenna installation assistant application 616 as described in the present disclosure. Non-transitory instructions stored at the memory 604 may cause the computing device 600 to perform various actions attributed to the assistant application 616, e.g., executing GUIs, obtaining hardware configuration information, communicating with antennas, modems and/or other on-board hardware, calculating noise or path loss, etc.

The computing device 600 may include additional, fewer, and/or alternate components in various embodiments, including components described in this detailed description.

Example Computer-Implemented Method

Figure 7:
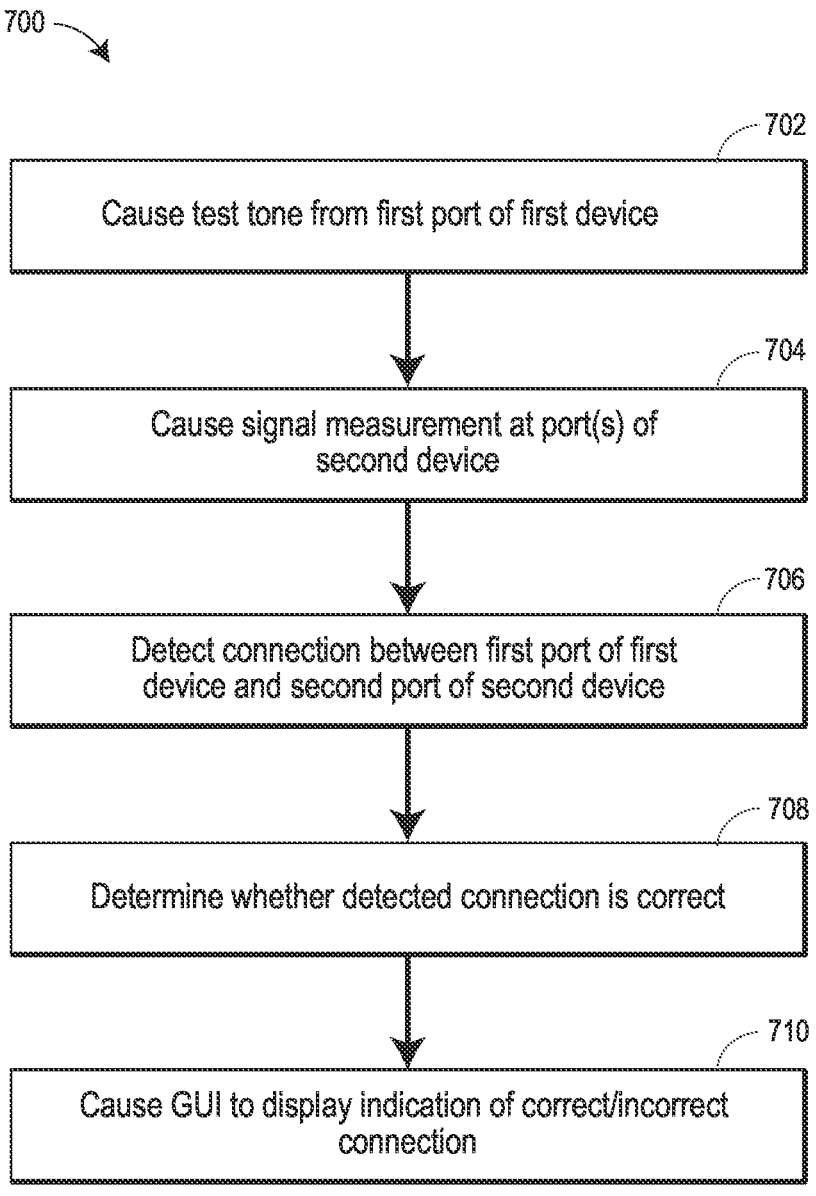
FIG. 7 depicts an example computer-implemented method, in accordance with some embodiments.

FIG. 7 depicts an example computer-implemented method 700, in accordance with some embodiments. The method 700 may be implemented, for example, via computing elements described in FIGS. 1 and 5 (e.g., electronic device(s) 110 and/or 600).

The method 700 includes, via a first communicative connection, causing a test tone to be transmitted via a first port of a first device from among a set of physical devices associated with a vehicle-based communication network (702). The set of physical devices may, for example, include a vehicle-mountable antenna and an on-board modem, or a vehicle-mountable antenna and another network hardware element of the vehicle-based communication network. Accordingly, the first port of the first device may be a first port of the antenna, modem and/or other physical network hardware element of the vehicle-based communication network. The first communicative connection may be a direct or indirect communicative connection to the antenna, modem, and/or other physical network hardware element.

The method 700 further includes, via second communicative connection, causing a signal measurement to be performed at one or more ports of a second device from among the set of on-board devices (704). If the first port from action 702 was a first port of the antenna, the one or more ports of the second device may, for example, one or more ports of the on-board modem (or other on-board network hardware element). Conversely, if the first port from action 702 was a first port of the on-board modem (or other on-board network hardware element), the one or more ports of the second device may be one or more ports of the antenna. Accordingly, the second communicative connection may be a direct or indirect communicative connection to the antenna, modem, and/or other physical network hardware element.

In some embodiments, causing the signal measurement to be performed includes causing signal measurements at each of a plurality of ports of the second device (effectively, to test whether the first port has been wired to any port of the second device. Alternatively, causing the signal measurement to be performed may include referencing hardware configuration information indicative of correct communicative connections among the first and second devices (that is, mapping which ports should be linked). By referencing the hardware configuration information, the signal measurement may be performed at, and only at, one port of the second device that is correct for the first port of the first device.

The method 700 further includes, based upon the test tone and the signal measurement, detecting a communicative connection between the first port of the first device and a second port from among the one or more ports of the second device (706). Particularly, when the signal measurement at the second port of the second device detects the test tone, the method 700 may determine that the first port of the first device has been linked to the second port of the second device.

The method 700 still further includes determining whether the detected communicative connection is correct for the first and second devices (708). Specifically, the determination may be made based upon the hardware configuration information indicative of correct communicative connections among the set of devices (e.g., based upon the threshold noise or path loss).

The method 700 still yet further includes causing an indication of whether the detected communicative connection is correct to be displayed via one or more graphical user interfaces (GUIs) at an electronic computing device of a user (710). The one or more GUIs may, for example, include one or more GUIs including elements described with respect to FIGS. 2-5. The electronic computing device of the user may, for example, include an on-board or off-board device of an installer, operator, maintenance personnel, etc. (e.g., a smartphone, smart wearable device, tablet, laptop, desktop, etc.).

In some embodiments, the method 700 includes calculating a path loss between the first port of the first device and the second port of the second device, based upon the test tone and the signal measurement (e.g., comparison of the power density of the test tone and of the signal measurement). In these embodiments, the method 700 may further include causing an indication of the calculated path loss to be displayed via the one or more GUIs. Moreover, the method 700 may include comparing the calculated path loss to a pre-determined threshold value for the detected communicative connection. If the calculated path loss is below the threshold and thus the connection is correct, the method 700 may still further include causing the on-board modem to update a stored path loss calibration for the detected communicative connection, and/or communicating with one or more other network elements (e.g., ground-based system elements) to update the path loss calibration and thereby calibrate the system.

The method 700 may be performed, for example, at an installation time of the antenna (e.g., the first installation of the antenna to the vehicle, or a re-installation of the antenna for example after maintenance or repair of the vehicle). Additionally or alternatively, the method 70 may be performed at a boot time of the on-board modem and/or other network hardware elements (e.g., for each transmit made by the vehicle).

The mountable antenna need not yet be actually mounted to the vehicle at the time at which certain actions of the method 700 are performed. For example, an installer may wire the antenna to on-board network hardware elements (and test the communicative connections according to the methods herein), before the antenna has yet been fully mounted to the vehicle (i.e., physically affixed to the vehicle in a manner suitable for transit, for example via bolts, latches, adhesives, etc.).

It should be appreciated that the method 700 may contain still additional, fewer, and/or alternate actions to those depicted in FIG. 7, including any suitable actions described in this detailed description. Moreover, the order of actions in the method 700 may vary, in some embodiments. In some embodiments, the method 700 is implemented by one or more processors executing instructions stored at one or more non-transitory computer readable media or one or more computer memories of a computing device (e.g., device 110 of FIG. 1 or device 600 of FIG. 6).

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

When implemented, any of the methods and techniques described herein or portions thereof may be performed by executing software stored in one or more non-transitory, tangible, computer readable storage media or memories such as magnetic disks, laser disks, optical discs, semiconductor memories, biological memories, other memory devices, or other storage media, in a RAM or ROM of a computer or processor, etc.

This detailed description is to be construed as examples and does not describe every possible embodiment, as describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects:

1. A computer-implemented method for configuring an antenna to a modem for a communication network on-board a vehicle, performed via one or more processors of a computing device, the method comprising: via a first communicative connection, causing a test tone to be transmitted via a first port of a first device from among a set of physical devices associated with a vehicle-based communication network, the set of devices consisting of an on-board modem of a vehicle and an antenna mountable to the vehicle; via a second communicative connection, causing a signal measurement to be performed at one or more ports of a second device from among the set of on-board devices; based upon the test tone and the signal measurement, detecting a communicative connection between the first port of the first device and a second port from among the one or more ports of the second device; based upon a comparison of the detected communicative connection to hardware configuration information indicative of correct communicative connections among the set of devices, determining whether the detected communicative connection between the first port and the second port is correct for the set of devices; and/or causing an indication of whether the detected communicative connection is correct to be displayed via a graphical user interface at an electronic computing device of a user.

2. The method of aspect 1, further comprising: based upon the test tone and the signal measurement, calculating a path loss between the first port of the first device and the second port of the second device; and/or causing an indication of the calculated path loss to be displayed via the graphical user interface.

3. The method of aspect 2, further comprising: comparing the calculated path loss to a pre-determined threshold value for the detected communicative connection; and/or responsive to the calculated path loss being below the pre-determined threshold, causing the on-board modem to update a stored path loss calibration for the detected communicative connection.

4. The method of any one of aspects 1 to 3, wherein the causing of the transmission of the test tone is performed at an installation time of the antenna.

5. The method of any one of aspects 1 to 4, wherein the causing of the transmission of the test tone is performed at a boot time of the on-board modem.

6. The method of any one of aspects 1 to 5, wherein causing the signal measurement to be performed at the one or more ports of the second device comprises: based upon the hardware configuration information, identifying a particular port that is to be connected to the first port of the first device, the particular port being identified from among the one or more ports of the second device based upon the hardware configuration information; and/or causing the signal measurement to be performed at the particular port.

7. The method of any one of aspects 1 to 6, wherein the first device from among the set of devices is the on-board modem and the second device from among the set of devices is the antenna.

8. The method of any one of aspects 1 to 6, wherein the first device from among the set of devices is the antenna and the second device from among the set of devices is the on-board modem.

9. The method of any one of aspects 1 to 8 in combination with any other suitable one of aspects 1 to 8.

10. One or more non-transitory computer readable media storing instructions that, when executed via one or more processors, cause one or more computing devices to: via a first communicative connection, cause a test tone to be transmitted via a first port of a first device from among a set of physical devices associated with a vehicle-based communication network, the set of devices consisting of an on-board modem of a vehicle and an antenna mountable to the vehicle; via a second communicative connection, cause a signal measurement to be performed at one or more ports of a second device from among the set of on-board devices; based upon the test tone and the signal measurement, detect a communicative connection between the first port of the first device and a second port from among the one or more ports of the second device; based upon a comparison of the detected communicative connection to hardware configuration information indicative of correct communicative connections among the set of devices, determine whether the detected communicative connection between the first port and the second port is correct for the set of devices; and/or cause an indication of whether the detected communicative connection is correct to be displayed via a graphical user interface at an electronic computing device of a user.

11. The one or more non-transitory computer readable media of aspect 10, wherein the instructions, when executed via the one or more processors, further cause one or more computers to: based upon the test tone and the signal measurement, calculate a path loss between the first port of the first device and the second port of the second device; and/or cause an indication of the calculated path loss to be displayed via the graphical user interface.

12. The one or more non-transitory computer readable media of aspect 11, wherein the instructions, when executed via the one or more processors, further cause the one or more computers to: compare the calculated path loss to a pre-determined threshold value for the detected communicative connection; and/or responsive to the calculated path loss being below the pre-determined threshold, cause the on-board modem to update a stored path loss calibration for the detected communicative connection.

13. The one or more non-transitory computer readable media of any one of aspects 10 to 12, wherein the instructions to cause the transmission of the test tone include instructions to cause the transmission of the test tone at an installation time of the antenna.

14. The one or more non-transitory computer readable media of any one of aspects 10 to 13, wherein the instructions to cause the transmission of the test tone include instructions to cause the transmission of the test tone at a boot time of the on-board modem.

15. The one or more non-transitory computer readable media of any one of aspects 10 to 14, wherein the instructions to cause the signal measurement to be performed at the one or more ports of the second device comprise instructions to: based upon the hardware configuration information, identify a particular port that is to be connected to the first port of the first device, the particular port being identified from among the one or more ports of the second device based upon the hardware configuration information; and/or cause the signal measurement to be performed at the particular port.

16. The one or more non-transitory computer readable media of any one of aspects 10 to 15, wherein the first device from among the set of devices is the on-board modem and the second device from among the set of devices is the antenna.

17. The one or more non-transitory computer readable media of any one of aspects 10 to 15, wherein the first device from among the set of devices is the antenna and the second device from among the set of devices is the on-board modem.

18. The one or more non-transitory computer readable media of any one of aspects 10 to 17, containing instructions according to any other suitable one of aspects 10 to 17.

19. The one or more non-transitory computer readable media of any one of aspects 10 to 18, containing instructions to perform the method of any suitable one of aspects 1 to 9.

20. A computing system associated with a vehicle-based communication network, the system comprising: an antenna mountable to a vehicle; an on-board modem of the vehicle; one or more processors; and one or more non-transitory memories storing instructions that, when executed via the one or more processors, cause the one or more processors to: via a first communicative connection, cause a test tone to be transmitted via a first port of a first device from among a set of physical devices associated with a vehicle-based communication network, the set of devices consisting of the on-board modem and the antenna; via a second communicative connection, cause a signal measurement to be performed at one or more ports of a second device from among the set of on-board devices; based upon the test tone and the signal measurement, detect a communicative connection between the first port of the first device and a second port from among the one or more ports of the second device; based upon a comparison of the detected communicative connection to hardware configuration information indicative of correct communicative connections among the set of devices, determine whether the detected communicative connection between the first port and the second port is correct for the set of devices; and/or cause an indication of whether the detected communicative connection is correct to be displayed via a graphical user interface at an electronic computing device of a user.

21. The computing system of aspect 20, wherein the instructions, when executed via the one or more processors, further cause the one or more processors to: based upon the test tone and the signal measurement, calculate a path loss between the first port of the first device and the second port of the second device; and/or cause an indication of the calculated path loss to be displayed via the graphical user interface.

22. The computing system of aspect 21, wherein the instructions, when executed via the one or more processors, further cause the one or more processors to: compare the calculated path loss to a pre-determined threshold value for the detected communicative connection; and/or responsive to the calculated path loss being below the pre-determined threshold, cause the on-board modem to update a stored path loss calibration for the detected communicative connection.

23. The computing system of any one of aspects 20 to 22, wherein the instructions to cause the transmission of the test tone include instructions to cause the transmission of the test tone at an installation time of the antenna.

24. The computing system of any one of aspects 20 to 23, wherein the instructions to cause the transmission of the test tone include instructions to cause the transmission of the test tone at a boot time of the on-board modem.

25. The computing system of any one of aspects 20 to 24, wherein the instructions to cause the signal measurement to be performed at the one or more ports of the second device comprise instructions to: based upon the hardware configuration information, identify a particular port that is to be connected to the first port of the first device, the particular port being identified from among the one or more ports of the second device based upon the hardware configuration information; and/or cause the signal measurement to be performed at the particular port.

26. The computing system of any one of aspects 20 to 25, wherein the first device from among the set of devices is the on-board modem and the second device from among the set of devices is the antenna.

27. The computing system of any one of aspects 20 to 25, wherein the first device from among the set of devices is the antenna and the second device from among the set of devices is the on-board modem.

28. The computing system of any one of aspects 20 to 27, configured to perform the actions of any other suitable one of aspects 20 to 27.

29. The computing system of any one of aspects 20 to 28, containing in the non-transitory instructions of any suitable one of aspects 10 to 19.

30. The computing system of any one of aspects 20 to 29, configured to perform the method of any suitable one of aspects 1 to 9.

31. Any one of aspects 1 to 30 in combination with any other suitable one of aspects 1 to 30.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed:

1. A computer-implemented method, performed via one or more processors of a computing device, the method comprising:

via a first communicative connection, causing a test tone to be transmitted via a first port of a first device from among a set of devices on-board a vehicle and associated with a vehicle-based communication network, the set of devices comprising an on-board modem of the vehicle and an antenna mountable to the vehicle;

via a second communicative connection, causing a signal measurement to be performed at one or more ports of a second device from among the set of devices;

based upon the test tone and the signal measurement, detecting a communicative connection between the first port of the first device and a second port from among the one or more ports of the second device;

based upon a comparison of one or more measurements indicative of the detected communicative connection to hardware configuration information indicative of correct communicative connections among the set of devices, determining whether the detected communicative connection between the first port and the second port is correct for the set of devices; and causing an indication of whether the detected communicative connection is correct to be displayed via a graphical user interface at an electronic computing device of a user.

2. The computer-implemented method of claim 1, further comprising:

based upon the test tone and the signal measurement, calculating a path loss between the first port of the first device and the second port of the second device; and causing an indication of the calculated path loss to be displayed via the graphical user interface.

3. The computer-implemented method of claim 2, further comprising:

comparing the calculated path loss to a pre-determined threshold value for the detected communicative connection; and responsive to the calculated path loss being below the pre-determined threshold value, causing the on-board modem to update a stored path loss calibration for the detected communicative connection.

4. The computer-implemented method of claim 1, wherein the causing of the transmission of the test tone is performed at an installation time of the antenna.

5. The computer-implemented method of claim 1, wherein the causing of the transmission of the test tone is performed at a boot time of the on-board modem.

6. The computer-implemented method of claim 1, wherein causing the signal measurement to be performed at the one or more ports of the second device comprises:

based upon the hardware configuration information, identifying a particular port that is to be connected to the first port of the first device, the particular port being identified from among the one or more ports of the second device based upon the hardware configuration information; and causing the signal measurement to be performed at the particular port.

7. The computer-implemented method of claim 1, wherein the first device from among the set of devices is the on-board modem and the second device from among the set of devices is the antenna.

8. The computer-implemented method of claim 1, wherein the first device from among the set of devices is the antenna and the second device from among the set of devices is the on-board modem.

9. One or more non-transitory computer-readable media storing instructions that, when executed via one or more processors, cause one or more computing devices to:

via a first communicative connection, cause a test tone to be transmitted via a first port of a first device from among a set of devices on-board a vehicle and associated with a vehicle-based communication network, the set of devices comprising an on- board modem of the vehicle and an antenna mountable to the vehicle;

via a second communicative connection, cause a signal measurement to be performed at one or more ports of a second device from among the set of devices;

based upon the test tone and the signal measurement, detect a communicative connection between the first port of the first device and a second port from among the one or more ports of the second device;

based upon a comparison of one or more measurements indicative of the detected communicative connection to hardware configuration information indicative of correct communicative connections among the set of devices, determine whether the detected communicative connection between the first port and the second port is correct for the set of devices; and cause an indication of whether the detected communicative connection is correct to be displayed via a graphical user interface at an electronic computing device of a user.

10. The one or more non-transitory computer-readable media of claim 9, wherein the instructions, when executed via the one or more processors, further cause one or more computers to:

based upon the test tone and the signal measurement, calculate a path loss between the first port of the first device and the second port of the second device; and cause an indication of the calculated path loss to be displayed via the graphical user interface.

11. The one or more non-transitory computer-readable media of claim 10, wherein the instructions, when executed via the one or more processors, further cause the one or more computers to:

compare the calculated path loss to a pre-determined threshold value for the detected communicative connection; and responsive to the calculated path loss being below the pre-determined threshold value, cause the on-board modem to update a stored path loss calibration for the detected communicative connection.

12. The one or more non-transitory computer-readable media of claim 9, wherein the instructions to cause the transmission of the test tone include instructions to cause the transmission of the test tone at an installation time of the antenna.

13. The one or more non-transitory computer-readable media of claim 9, wherein the instructions to cause the transmission of the test tone include instructions to cause the transmission of the test tone at a boot time of the on-board modem.

14. The one or more non-transitory computer-readable media of claim 9, wherein the instructions to cause the signal measurement to be performed at the one or more ports of the second device comprise instructions to:

based upon the hardware configuration information, identify a particular port that is to be connected to the first port of the first device, the particular port being identified from among the one or more ports of the second device based upon the hardware configuration information; and cause the signal measurement to be performed at the particular port.

15. The one or more non-transitory computer-readable media of claim 9, wherein the first device from among the set of devices is the on-board modem and the second device from among the set of devices is the antenna.

16. The one or more non-transitory computer-readable media of claim 9, wherein the first device from among the set of devices is the antenna and the second device from among the set of devices is the on-board modem.

17. A computing system associated with a vehicle-based communication network, the system comprising:

an antenna mountable to a vehicle;

an on-board modem of the vehicle;

one or more processors; and one or more non-transitory memories storing instructions that, when executed via the one or more processors, cause the one or more processors to:

via a first communicative connection, cause a test tone to be transmitted via a first port of a first device from among a set of devices on-board the vehicle and associated with a vehicle-based communication network, the set of devices comprising the on-board modem and the antenna;

via a second communicative connection, cause a signal measurement to be performed at one or more ports of a second device from among the set of devices;

based upon the test tone and the signal measurement, detect a communicative connection between the first port of the first device and a second port from among the one or more ports of the second device;

based upon a comparison of one or more measurements indicative of the detected communicative connection to hardware configuration information indicative of correct communicative connections among the set of devices, determine whether the detected communicative connection between the first port and the second port is correct for the set of devices; and cause an indication of whether the detected communicative connection is correct to be displayed via a graphical user interface at an electronic computing device of a user.

18. The computing system of claim 17, wherein the instructions, when executed via the one or more processors, further cause the one or more processors to:

based upon the test tone and the signal measurement, calculate a path loss between the first port of the first device and the second port of the second device; and cause an indication of the calculated path loss to be displayed via the graphical user interface.

19. The computing system of claim 18, wherein the instructions, when executed via the one or more processors, further cause the one or more processors to:

compare the calculated path loss to a pre-determined threshold value for the detected communicative connection; and responsive to the calculated path loss being below the pre-determined threshold value, cause the on-board modem to update a stored path loss calibration for the detected communicative connection.

20. The computing system of claim 17, wherein the instructions to cause the transmission of the test tone include instructions to cause the transmission of the test tone at an installation time of the antenna.

* * * * *